(No Model.)
J. BENNITT.
BARLEY FORK.
No. 247,294. Patented Sept. 20, 1881.
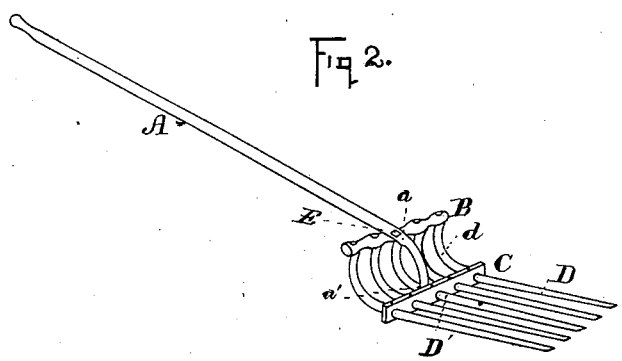
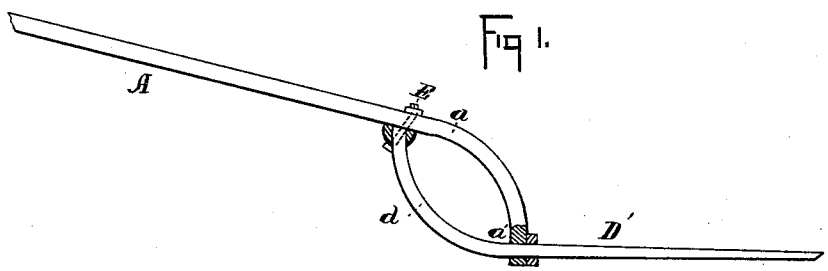

UNITED STATES PATENT OFFICE.

JOEL BENNITT, OF PALO, MICHIGAN, ASSIGNOR OF ONE-HALF TO RICHARD MILLER, OF SAME PLACE.

BARLEY-FORK.

SPECIFICATION forming part of Letters Patent No. 247,294, dated September 20, 1881.

Application filed May 31, 1881. (No model.)

*To all whom it may concern:*

Be it known that I, JOEL BENNITT, of Palo, county of Ionia, State of Michigan, have invented a new and useful Improvement in Barley-Forks; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter set forth, and more particularly pointed out in the claims.

In the drawings, Figure 1 is a longitudinal central section of the device. Fig. 2 is a perspective view of the same.

This device is designed as an improvement upon that patented to F. Dunn, No. 100,382, of March 1, 1870, and that patented to Wright and Park, No. 114,080, of April 25, 1871; and it consists in a novel construction and arrangement, which will be hereinafter fully described.

Referring to the drawings, A is a handle; B, the rear cross-piece; C, the forward cross-piece; D D', the tines. The handle A is bent abruptly over and downward at *a* into nearly a quadrant of a circle, while the portions *d* of the tines between the cross-pieces are curved abruptly upward into nearly the quadrant of a circle, passing through the cross-piece C, to which they are riveted, and seated at their heels into the rear cross-piece, B, to which they may be secured by rivets or wedges.

Heretofore a central tine has been impracticable, owing to the presence of the forward end of the handle at this point; but I provide a central tine, D', and pass it through the end of the handle at *a'*, as shown in Fig. 1, thus making it serve the purpose of a fastener for this handle end. So, also, in connection with the curved end of the handle there is constituted a truss, which prevents the curved parts of the handle and the tines from straightening out by the effect of moisture or climatic changes.

A bolt, E, serves to fasten the rear cross-piece to the handle. The tines, it will be observed, lie flat upon the ground from the forward cross-bar, C, to their points, and the points do not turn up.

It is obvious that a fork thus constructed will be well balanced, and will by its gravity hang right side up. Moreover, since its entire weight rests flat upon the ground, it is light and easy to use. The abrupt curve at the rear ends of the tines forms, without other bows or guards, an ample obstruction to prevent the material from passing over the heel of the fork.

It is obvious that the handle may pass either over or beneath the rear cross-piece; but I prefer to pass it over, as shown in the drawings, since it then receives directly the strain of the load at this point.

By this construction of fork I am enabled to locate a central tine and employ an odd number of tines—a great advantage over other forms, since before four tines were not enough and six were too many. I am enabled to use five.

I am aware that forks have been made with a series of tines bent up abruptly at their rear portions, and joined to an end cross-bar, while braced and secured in proper position by an intermediate cross-bar lying in advance of the bends; and, also, that the handle of a fork has been bent over an end cross-bar connecting the tines, and had its end secured under and to an intermediate cross-bar, and I lay no claim to such forks.

What I claim is—

1. A fork consisting of an odd number of tines united at their rear ends and at a point in advance thereof by cross-pieces, and a handle, the forward end of which unites the two cross-pieces, the middle tine passing through the end of the handle, substantially as described.

2. A fork consisting of an odd number of wooden tines united at their rear ends by a cross-piece and passing through another cross-piece in advance of the latter, the tines between the cross-pieces bent to nearly a quadrant of a circle, and in connection therewith a handle bent at its forward end over and downward to nearly a quadrant of a circle, fastened to the rear cross-piece by the middle tine being passed through its extremity, substantially as described.

In testimony whereof I sign this specification in the presence of two witnesses.

JOEL BENNITT.

Witnesses:
HENRY MILLER,
RICHARD MILLER.